United States Patent
Bagasra

(10) Patent No.: US 8,763,056 B2
(45) Date of Patent: Jun. 24, 2014

(54) BANDWIDTH MANAGEMENT FOR PACKET-BASED PROGRAM SERVICE

(75) Inventor: Abbas Bagasra, Concord, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 13/414,020

(22) Filed: Mar. 7, 2012

(65) Prior Publication Data

US 2013/0239154 A1   Sep. 12, 2013

(51) Int. Cl.
*H04N 7/173* (2011.01)

(52) U.S. Cl.
USPC ................ 725/95; 725/87; 725/93

(58) Field of Classification Search
CPC .............. H04N 21/2385; H04N 21/24; H04N 21/2402; H04N 21/442; H04N 21/44209; H04L 12/2439
USPC ............... 725/93–95, 133, 141, 153
See application file for complete search history.

(56) References Cited

U.S. PATENT DOCUMENTS

| | | | | |
|---|---|---|---|---|
| 5,673,262 | A * | 9/1997 | Shimizu | 370/385 |
| 7,698,432 | B2 * | 4/2010 | Short et al. | 709/226 |
| 8,024,438 | B2 * | 9/2011 | Bedingfield et al. | 709/223 |
| 8,098,582 | B2 * | 1/2012 | Aaron et al. | 370/235 |
| 8,627,389 | B2 * | 1/2014 | Craner | 725/94 |
| 2003/0046704 | A1 * | 3/2003 | Laksono et al. | 725/96 |
| 2009/0006626 | A1 * | 1/2009 | Yamagishi | 709/226 |
| 2009/0288129 | A1 * | 11/2009 | Wolfe et al. | 725/116 |
| 2011/0083154 | A1 * | 4/2011 | Boersma | 725/109 |
| 2011/0131331 | A1 * | 6/2011 | Brunson et al. | 709/227 |
| 2011/0261835 | A1 * | 10/2011 | Dhesikan et al. | 370/468 |

* cited by examiner

*Primary Examiner* — Benjamin R Bruckart
*Assistant Examiner* — Akshay Doshi

(57) ABSTRACT

Method, device, and storage medium for receiving a request for a program from a user device; querying bandwidth state information; identifying whether the bandwidth state information indicates that the user device is allocated bandwidth, based on a previous request for another program, that is at least equal to a required bandwidth to deliver the program; requesting a bandwidth based on an identification that the bandwidth state information indicates that the user device is not allocated bandwidth that is at least equal to the required bandwidth; receiving an indication that the requested bandwidth is provisioned; and deliver the program to the user device.

20 Claims, 9 Drawing Sheets

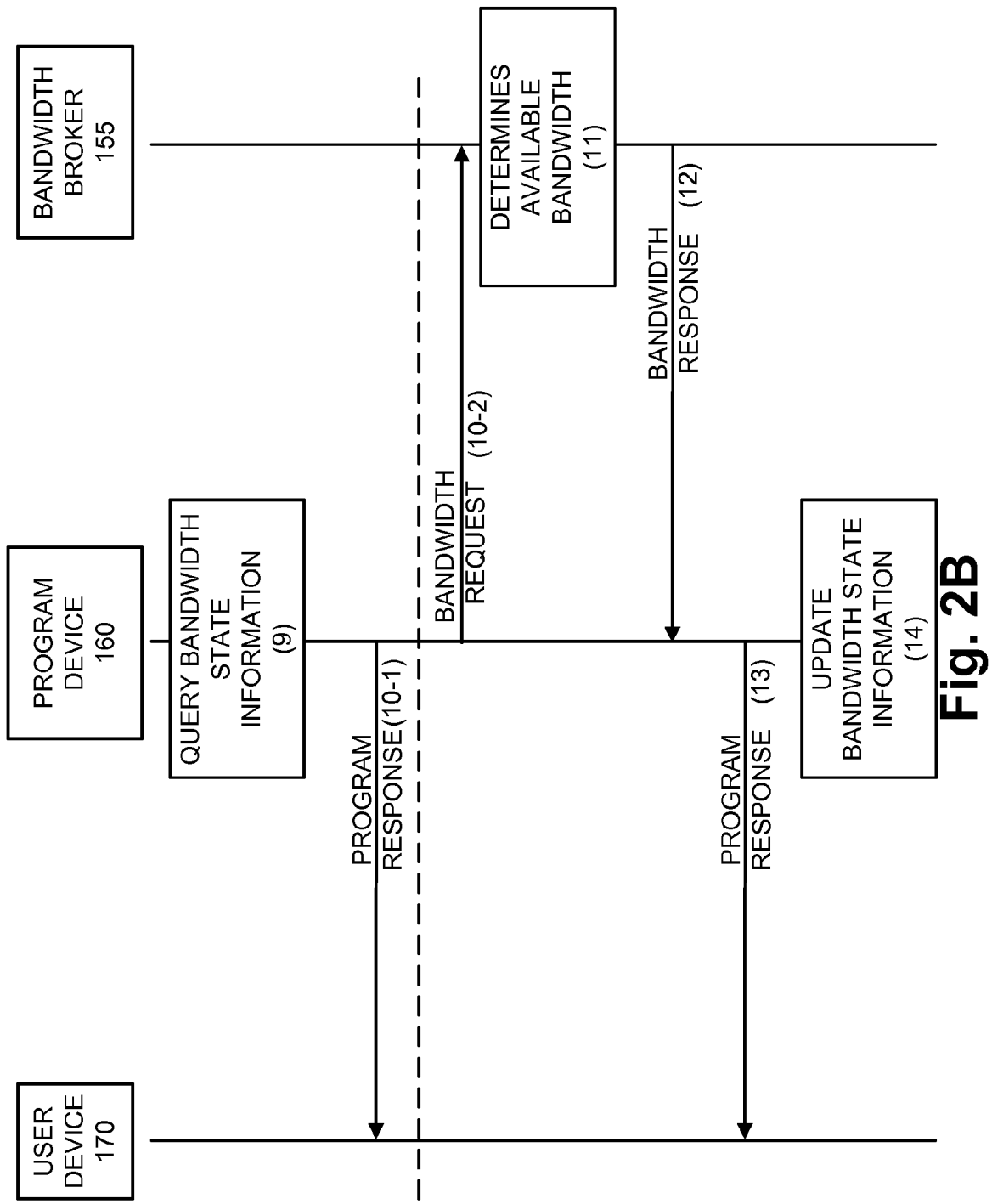

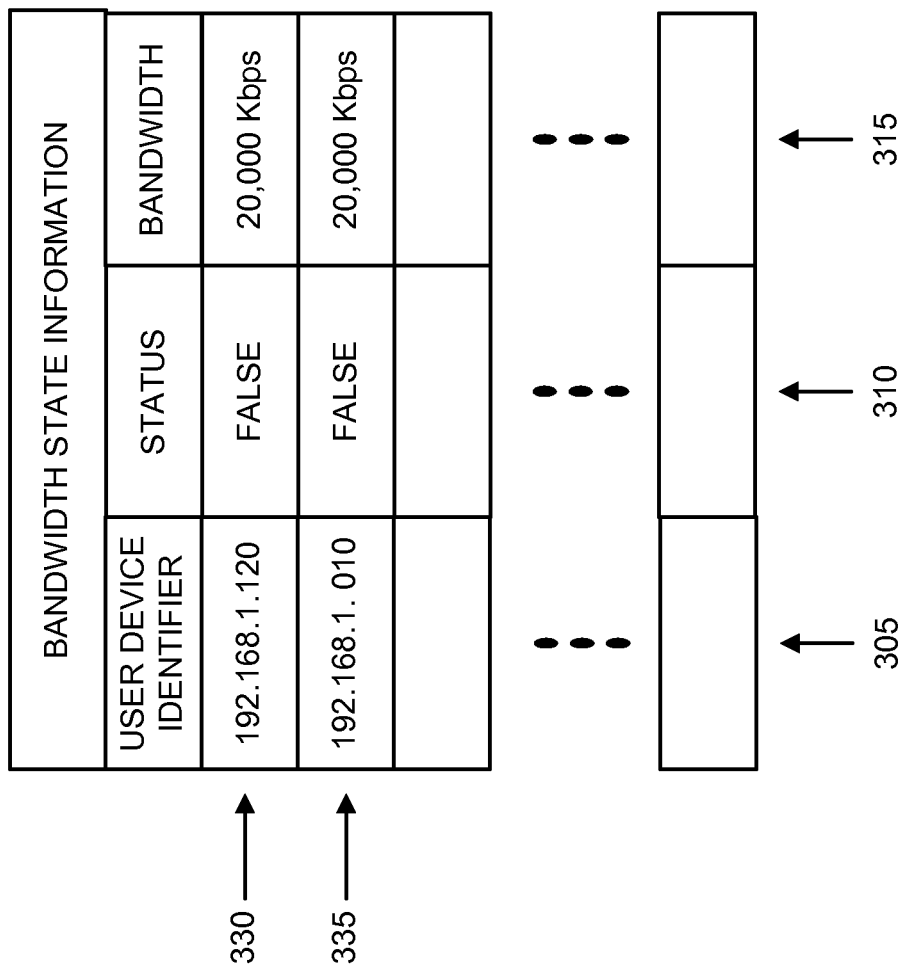

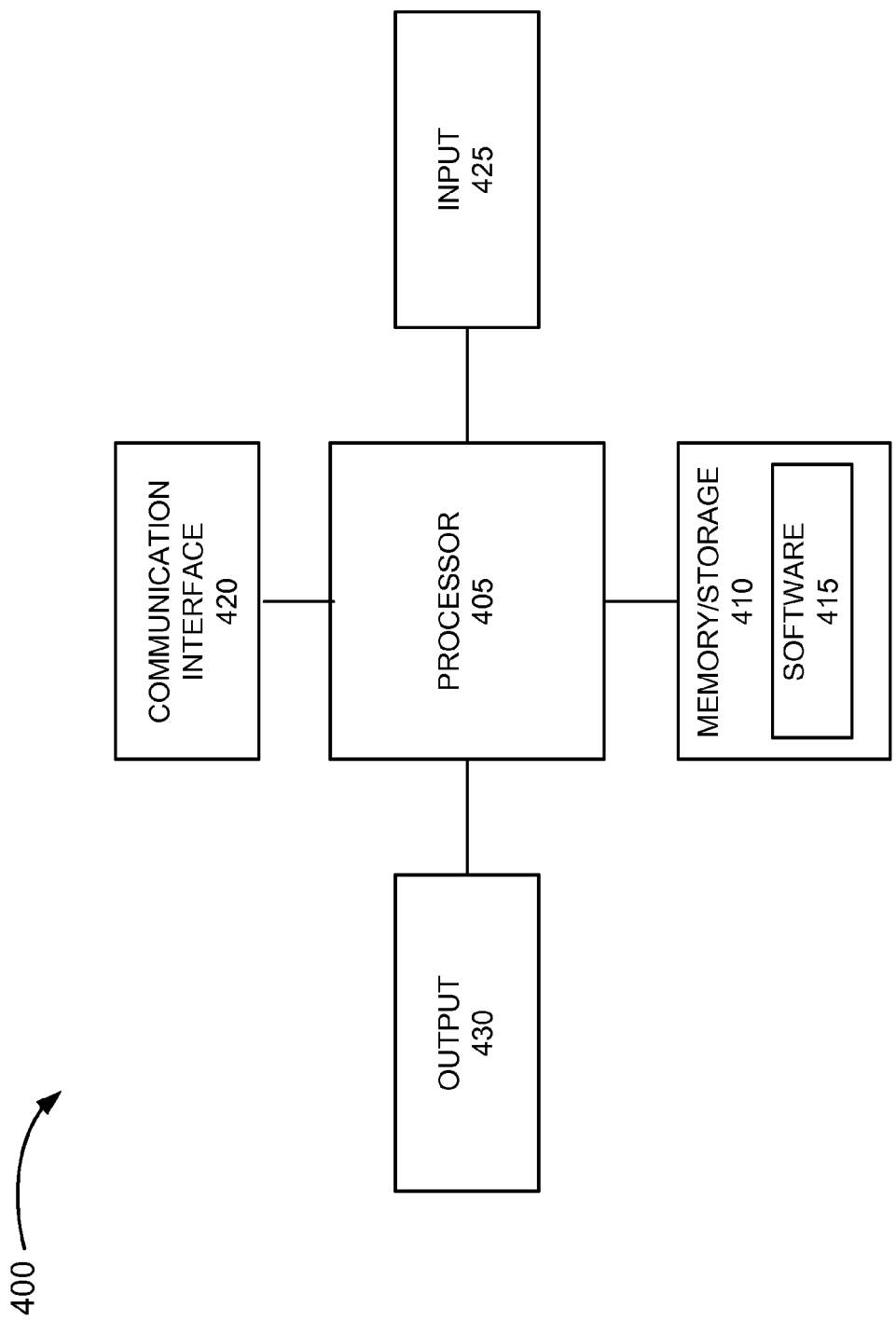

BANDWIDTH MANAGEMENT FOR PACKET-BASED PROGRAM SERVICE

BACKGROUND

Internet Protocol television (IPTV) provides program services, such as television services, using IP. Customer premises equipment, such as IPTV set-top boxes, are used by customers to receive this type of program service.

DESCRIPTION OF THE DRAWINGS

FIGS. 2A and 2B are messaging diagrams pertaining to an exemplary process performed by an exemplary embodiment of a program delivery system;

FIGS. 3A-3C are diagrams illustrating an exemplary database or data structure that store bandwidth state information;

FIG. 4 is a diagram illustrating exemplary components of a device that may correspond to one or more of the devices previously depicted.

DETAILED DESCRIPTION

The following detailed description refers to the accompanying drawings. The same reference numbers in different drawings may identify the same or similar elements.

The term "program" includes video and/or audio content. For example, a program includes a program of a television channel, such as a local program, a national program, a television show, a movie, a sporting event, a news program, a musical event, a shopping program, a pay-per-view program, a video-on-demand program, a commercial, or an audio program (e.g., a program that plays music, a music channel that is of a particular musical genre, etc.). Additionally, for example, a program may include content from the Internet.

One of the mechanisms to support Quality of Service (QoS) in a network (e.g., a home network) is to use an admission and control method. An admission and control method may include a brokering of bandwidth. In the context of program delivery, the brokering of bandwidth includes a request for bandwidth to deliver a program and a request to release the bandwidth when the program ends. In a scenario when a user channels surfs, a corresponding allocation and de-allocation of bandwidth takes place.

According to an exemplary embodiment, a program delivery system includes a computational device that delivers programs to a receiving device associated with a user. According to an exemplary embodiment, the program delivery system may be implemented using an IP unicast architecture and/or an IP multicast architecture.

According to an exemplary embodiment, the computational device receives a program request from the receiving device. According to an exemplary embodiment, the computational device stores state information pertaining to bandwidth allocation for the receiving device. According to an exemplary embodiment, the computational device determines whether to request bandwidth from a bandwidth broker device, in response to receiving a program request from the receiving device, based on the state information. According to an exemplary implementation, the state information indicates currently allocated bandwidth for the receiving device. According to an exemplary implementation, the state information indicates whether a previous program request has been provisioned.

While exemplary embodiments provided in this description may be implemented based on the use of a particular protocol, network architecture, platform, etc., such implementations are not intended to be restrictive or provide an exhaustive treatment, as such. In other words, the embodiments described herein may be implemented using other suitable protocols, network architectures, platforms, etc., which may not be specifically described.

Figure 1:
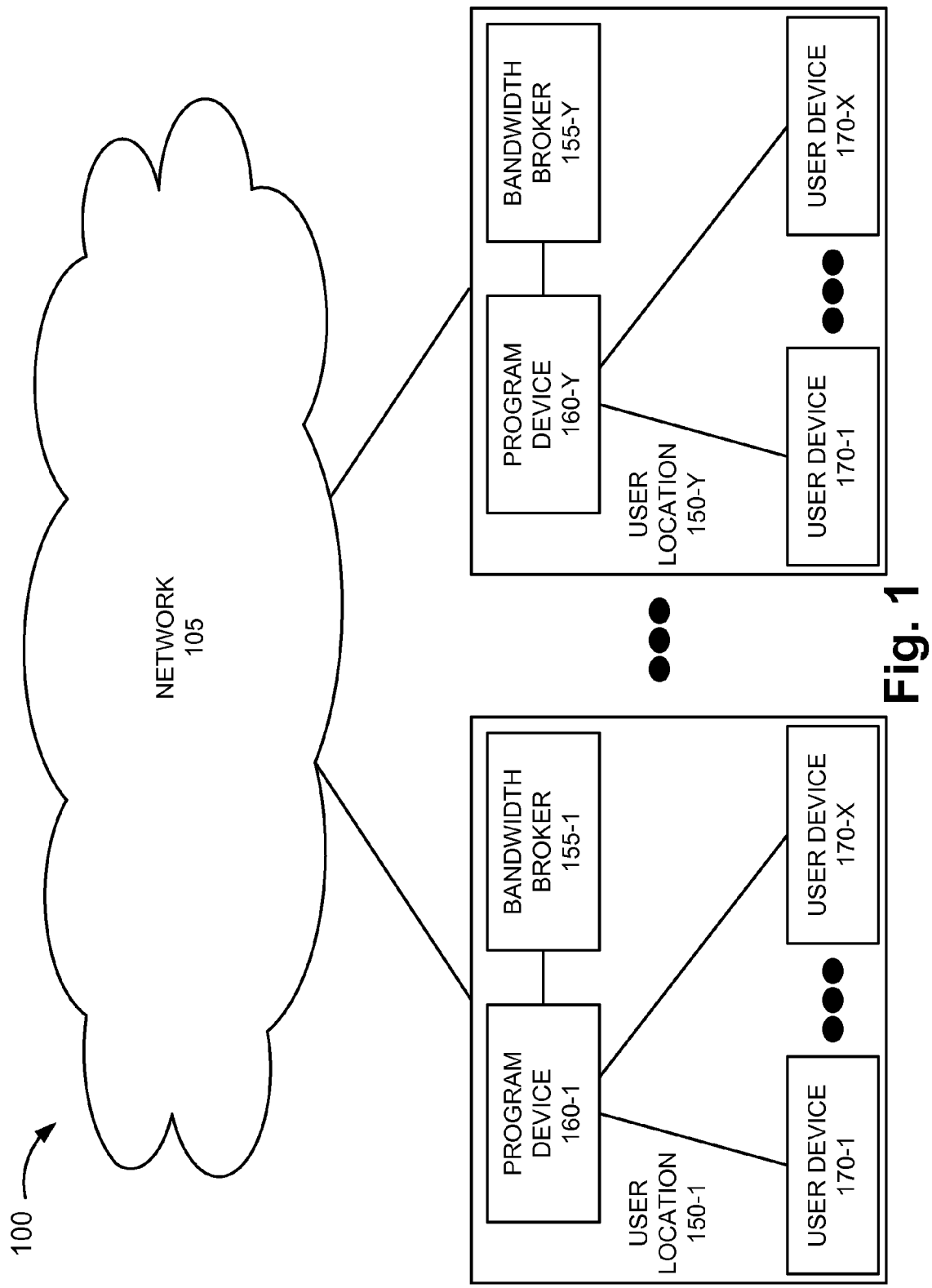
FIG. 1 is a diagram illustrating an exemplary environment in which an exemplary embodiment of bandwidth management for IP-based program service may be implemented.

FIG. 1 is a diagram illustrating an exemplary environment in which an exemplary embodiment of bandwidth management for IP-based program service may be implemented. As illustrated, environment 100 includes a network 105. Environment 100 also includes user locations 150-1 through 150-Y, in which Y>1 (also referred to collectively as user locations 150 and individually as user location 150). User locations 150 includes bandwidth brokers 155-1 through 155-Y, in which Y>1 (also referred to collectively as bandwidth brokers 155 and individually as bandwidth broker 155), program devices 160-1 through 160-Y, in which Y>1 (also referred to collectively as program devices 160 or individually as program device 160), and user devices 170-1 through 170-X, in which X>1 (also referred to collectively as user devices 170 or individually as user device 170).

The number of devices and networks, and the configuration in environment 100 are exemplary and provided for simplicity. According to other embodiments, environment 100 may include additional devices, fewer devices, different devices, and/or differently arranged devices, than those illustrated in FIG. 1. Additionally, or alternatively, environment 100 may include additional networks and/or differently arranged networks, than those illustrated in FIG. 1.

According to other embodiments, a single device in FIG. 1 may be implemented as multiple devices and/or multiple devices may be implemented as a single device. By way of example, bandwidth broker 155 and program device 160 may be combined into a single device. According to another example, program device 160 may be implemented as multiple devices.

A device may be implemented according to a centralized computing architecture or a distributed computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices, which may or may not include the particular device.

Environment 100 may be implemented to include wired and/or wireless connections among the devices and network illustrated. A connection may be direct or indirect and may involve intermediary device(s) and/or network(s) not illustrated in FIG. 1. Additionally, the number and the arrangement of connections between the devices and the networks are exemplary and provided for simplicity.

Network 105 includes a network that provides programs to users. For example, network 105 includes a program delivery network. The program delivery network may provide at least one of a television service, a mobile service, or an Internet service. Network 105 may correspond to a satellite-based network and/or a terrestrial-based network. For example, network 105 may be implemented as a program streaming network, a distribution network associated with a television delivery system, a mobile network, or a device in the Internet.

Although not illustrated, network 105 may include, for example, billing devices, application servers, security devices, routing devices, program source devices, etc.

User location 150 is a location of a user(s). For example, user location 150 may be a residence, a place of business, etc. User location 150 may include other devices not specifically illustrated, such as, a wireless router, etc.

Bandwidth broker 155 includes a device that interfaces with program device 160. For example, bandwidth broker 155 allocates bandwidth to program device 160 for use to deliver programs to user device 170. Bandwidth broker 155 includes logic to manage bandwidth resources and allocate available bandwidth to provide QoS for a program service. For example, bandwidth broker 155 may provide QoS control and management functions, such as admission control, resource reservation and provisioning. As an example, bandwidth broker 155 may be implemented based on a Universal Plug and Play (UPnP) QoS specification (e.g., UPnP QoS v. 3.0, etc.). Bandwidth broker 155 may be implemented as, for example, a computational device (e.g., a computer), a server device, a router device (e.g., an in-home router device, a broadband router, a wireless router, etc.), or other suitable device.

Program device 160 includes a device that interfaces with network 105, bandwidth broker 155, and user device 170. For example, program device 160 receives programs from network 105. Program device 160 obtains bandwidth allocation from bandwidth broker 155 for use to deliver programs to user device 170. Program device 160 provides programs to user device 170. Program device 110 may be implemented as, for example, a computational device (e.g., a computer), a server device (e.g., a media server device, etc.), a set top box, or other suitable device. The term "set top box" may include, for example, a converter box, a television receiver, a tuner device, a digibox device, an IP set top box, an IPTV set top box, and/or some other type of device capable of performing processes described herein.

User device 170 includes a device that communicates with network 105 via program device 160. For example, user device 170 may be implemented as a mobile device or a portable device (e.g., a smartphone, a tablet device, a personal digital assistant (PDA), a personal communication system (PCS), etc.). Additionally, for example, user device 170 may be implemented as a television and a set top box, a computer (e.g., a desktop computer, a laptop computer, a palmtop computer, a netbook, etc.), a game system (e.g., a PS3® device, etc.), or other types of user devices capable of receiving programs.

Figure 2A:
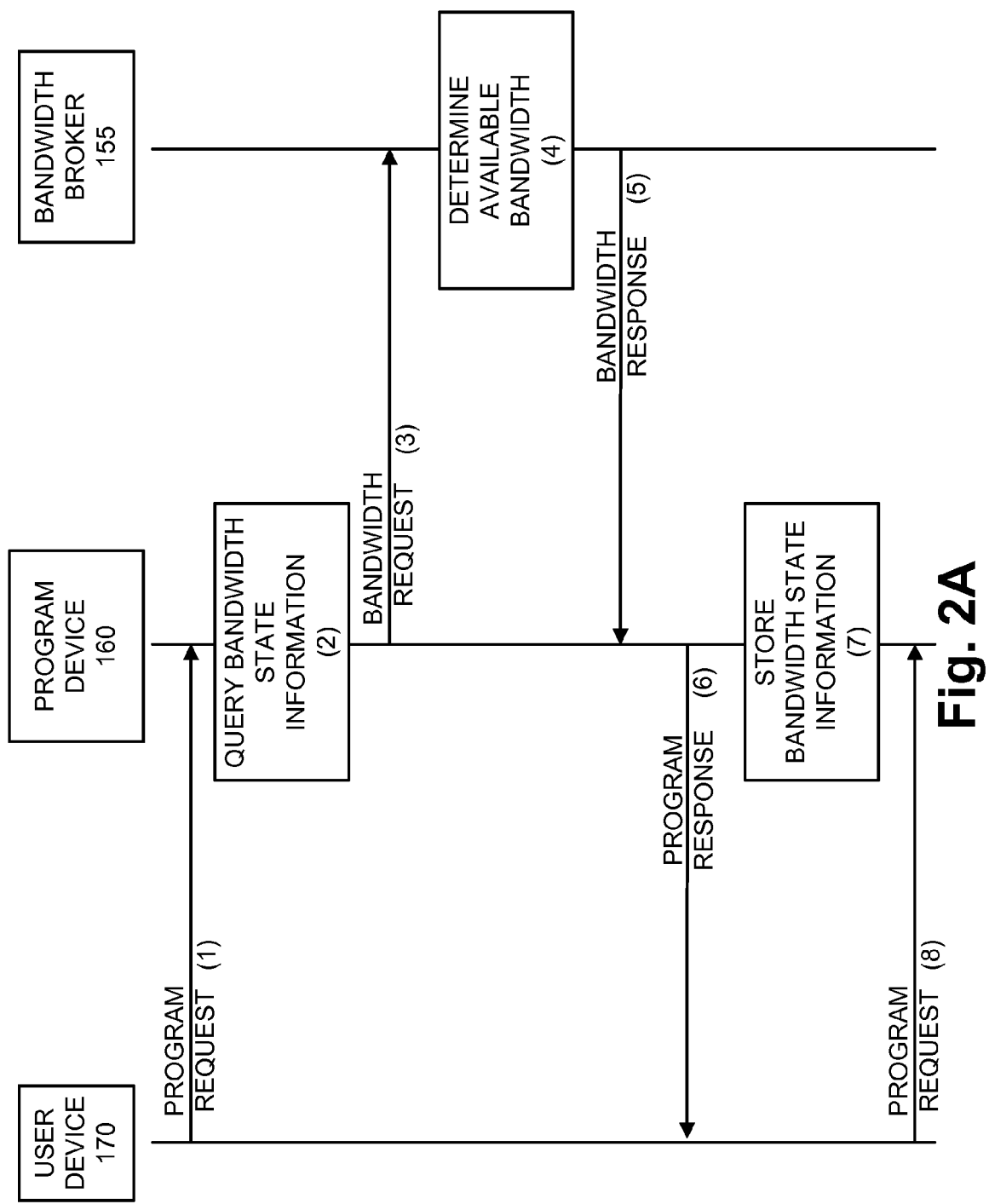

FIGS. 2A and 2B are messaging diagrams pertaining to an exemplary process performed by an exemplary embodiment of a program delivery system. The exemplary process is described in relation to the devices illustrated in environment 100 of FIG. 1. For purposes of description, it may be assumed that user device 170 has established a connection with program device 160. For example, user device 170 may establish a connection with program device 160 based on a discovery process. According to an exemplary implementation, as described further below, program device 160 may obtain user device information pertaining to user device 170 during a connection process.

The messages described and the data or information included therein are merely exemplary. According to other implementations, the program delivery system may use different types of messages and/or include different data or information. Additionally, or alternatively, although the exemplary process describes a particular device performing a step or act of the process, the step or act may, alternatively be performed by another device, or some combination of devices.

Figure 3A:
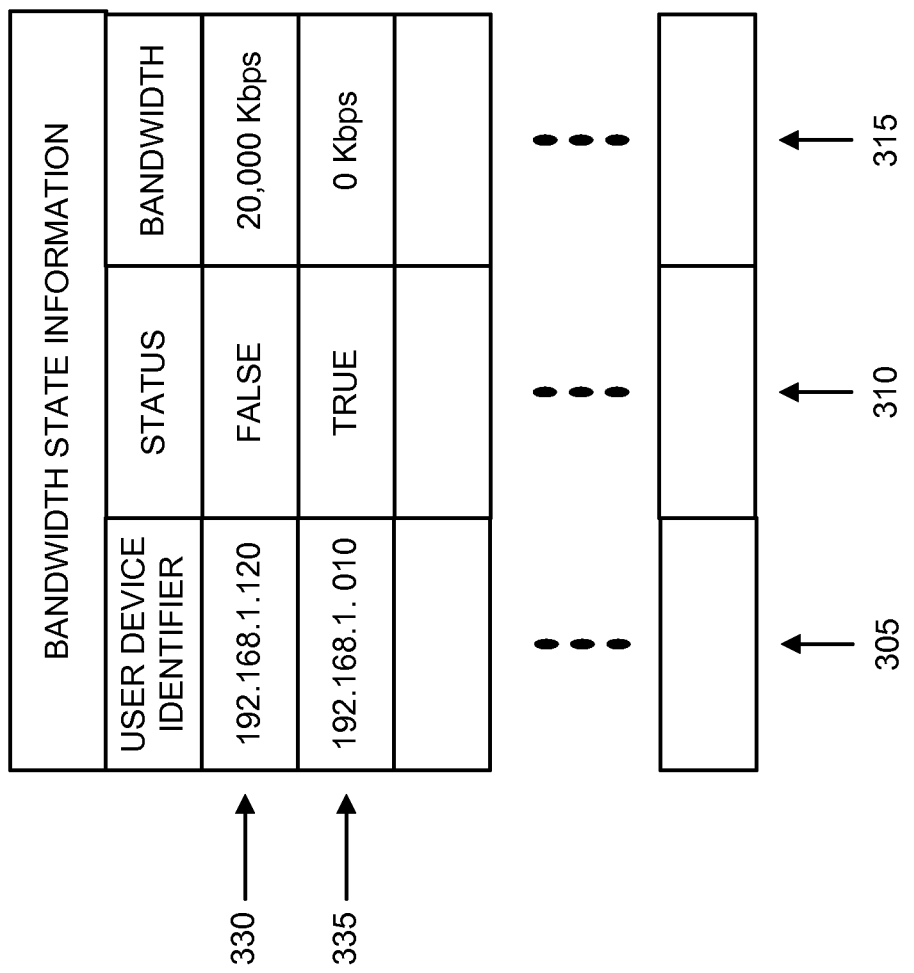
Figure 3C:
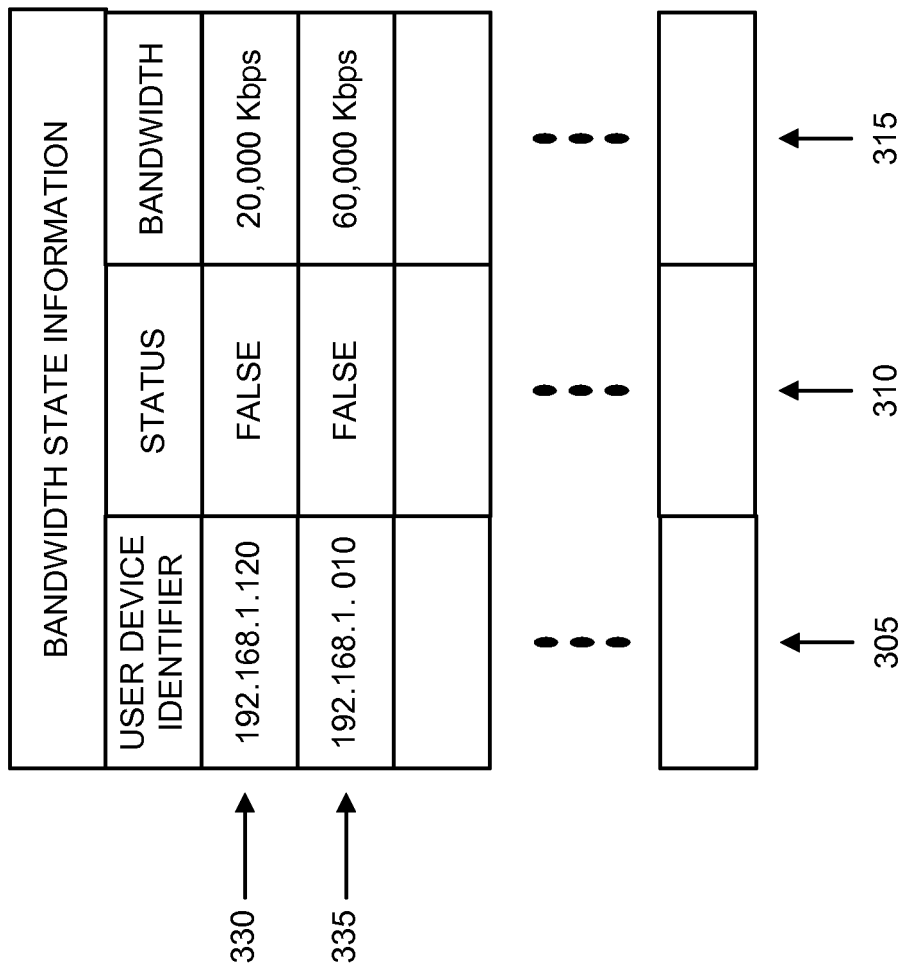

Referring to FIG. 2A, in step (1), user device 170 transmits a program request to program device 160. For example, in the case of user device 170 implemented as a set top box, the program request includes a television channel identifier corresponding to a television channel to which the user has tuned. In step (2), in response to receiving the program request, program device 160 queries bandwidth state information (e.g., stored as a data structure, a database, etc.). The bandwidth state information is stored by program device 160. FIG. 3A is a diagram illustrating an exemplary database or data structure storing bandwidth state information. As illustrated, the database or data structure includes a user device identifier field 305, a status field 310, and a bandwidth field 315. According to other implementations, the database or data structure may include additional fields, fewer fields, and/or different fields than those illustrated and described with respect to FIG. 3. For example, according to other implementations, the bandwidth state information does not include status field 310.

User device identifier field 305 includes data or information that indicates an identifier associated with user device 170. For example, the identifier may be implemented as a network address (e.g., an IP address, a Media Access Control (MAC) address, etc.). According to other implementations, the identifier may be implemented as an equipment identifier or another type of unique value or string pertaining to a user and/or user device 170.

Status field 310 includes data or information that indicates whether a previous program request has been provisioned. For example, status field 310 may be represented as one of two binary states, such as, true or false, yes or no, etc.

Bandwidth field 315 includes data or information that indicates a bandwidth allocated to deliver a program from program device 160 to user device 170.

Entry 330 and entry 335 are examples of records that map or correlate fields 305, 310, and 315. Referring to entry 330, status field 310 indicates "false" and a bandwidth of 20,000 Kbps. The "false" of status field 310 may be interpreted that a program request has been provisioned and bandwidth field 315 indicates the amount of bandwidth currently allocated to user device 170. Referring to entry 335, status field 310 indicates "true" and bandwidth of 0 Kbps. The "true" of status field 310 may be interpreted that a program request has not been provisioned and bandwidth field 315 indicates the amount of bandwidth currently allocated to user device 170.

Referring back to FIG. 2A, step (2), according to an exemplary scenario, assume that program device 160 queries the bandwidth state information and identifies entry 335 (as illustrated in FIG. 3A) as corresponding to user device 170, based on user device identifier field 305. With reference to entry 335, program device 160 identifies that status field 310 indicates "true." Program device 160 may also identify that bandwidth field 315 indicates 0 Kbps. As an example, this may be the case when user device 170 initially connects to program device 160 and has not received a program. According to another implementation, if entry 335 does not include a status field 310, program device 160 recognizes that user device 170 is not currently provisioned with a bandwidth based on bandwidth field 315. Based on the bandwidth information indicated in bandwidth field 315, program device 160 generates and transmits a bandwidth request. In this example, however, program device 160 generates and transmits a bandwidth request based on status field 310, as described further below in step (3).

In step (3), program device 160 generates and transmits a bandwidth request to bandwidth broker 155. Program device 160 selects a bandwidth to provision. For example, further to the example when user device 170 corresponds to a set top box, program device 160 selects the bandwidth based on the television channel identifier. According to an exemplary implementation, program device 160 includes logic that provides a mapping between a television channel identifier and bandwidth. As an example, some television channels may be standard definition channels each requiring a particular bandwidth, while other television channels may be high-definition channels each requiring another particular bandwidth. According to an exemplary implementation, the bandwidth request includes data indicating a requested bandwidth.

In step (4), bandwidth broker 155 receives the bandwidth request. Bandwidth broker 155 determines whether there is bandwidth available to service the bandwidth request. In this example, it may be assumed that bandwidth broker 155 determines that there is sufficient bandwidth available to service the bandwidth request. In step (5), bandwidth broker 155 generates and transmits a bandwidth response to program device 160.

In step (6), program device 160 receives the bandwidth response and transmits a program response to user device 170. According to an exemplary implementation, the program is delivered to user device 170 via program device 160. In step (7), program device 160 stores bandwidth state information pertaining to user device 170. For example, referring to FIG. 3B, program device 170 updates status field 310 and bandwidth field 315 of entry 335 with "true" and 20,000 Kbps.

In step (8), assume that user device 170 transmits another program request to program device 160. For example, the user may have changed television channels. Referring to FIG. 2B, program device 160 receives the program request, and in step (9), program device 160 queries the bandwidth state information pertaining to user device 170. Depending on the bandwidth needed to service user device 170 and the current provisioned bandwidth, two possible responses from program device 160 may occur, which are described further below.

In step (10-1), program device 160 generates and transmits a program response to user device 170 and the program is delivered to user device 170 via program device 160. For example, referring to FIG. 3B, program device 160 selects entry 335 and recognizes that status field 310 indicates "false" and bandwidth field 315 indicates 20,000 Kbps. Also, program device 160 determines that the bandwidth needed to service this program request (e.g., the program airing on the changed television channel) may be provisioned using the previously allocated bandwidth.

Referring back to FIG. 2B, in step (10-2), program device 160 generates and transmits a bandwidth request to bandwidth broker 155. For example, referring to FIG. 3B, program device 160 selects entry 335 and recognizes that status field 310 indicates "false" and bandwidth field 315 indicates 20,000 Kbps. Also, program device 160 determines that the bandwidth needed to service this program request (e.g., the program airing on the changed television channel) may not be provisioned using the previously allocated bandwidth. As an example, the user has changed from a standard definition television channel to a high-definition television channel. According to such circumstances, program device 160 determines that more bandwidth is needed to service the program request.

In a manner similar to that previously described with respect to steps (4)-(7), bandwidth broker 155 receives the bandwidth request. Bandwidth broker 155 determines whether there is bandwidth available to service the bandwidth request. In this example, it may be assumed that bandwidth broker 155 determines that there is sufficient bandwidth available to service the bandwidth request. In step (12), bandwidth broker 155 generates and transmits a bandwidth response to program device 160.

In step (13), program device 160 receives the bandwidth response and transmits a program response to user device 170. According to an exemplary implementation, the program is delivered to user device 170 via program device 160. In step (14), program device 160 stores bandwidth state information pertaining to user device 170. For example, referring to FIG. 3C, program device 170 updates bandwidth field 315 of entry 335 to 60,000 Kbps.

While FIGS. 2A and 2B are messaging diagrams pertaining to an exemplary process performed by an exemplary embodiment of a program delivery system, according to other scenarios, the message(s) transmitted and/or received may be different, and/or the step(s) or act(s) described may be different. By way of example, in the event that bandwidth broker 155 determines that there is not available bandwidth, according to exemplary implementation, bandwidth broker 155 may deny a bandwidth request. According to another implementation, bandwidth broker 155 may generate and transmit a counter bandwidth request to program device 160. As an example, assume that the bandwidth request from program device 160 seeks bandwidth for a high-definition program. Bandwidth broker 155 determines that there is not sufficient bandwidth available for provisioning. However, bandwidth broker 155 determines that there is sufficient bandwidth available for a standard definition program. In some cases, for example, a program may be available in both standard definition and high-definition. According to such a case, bandwidth broker 155 transmits the counter bandwidth request. Program device 160 receives the counter bandwidth request and transmits a counter program response to user device 170. User device 170 may generate a user prompt indicating, for example, that the high-definition program is not available, but that the program is available in standard definition. The user may either accept or deny the counter offer. If accepted, program device 160 and bandwidth broker 155 provision the delivery of the program, in standard definition, to user device 170. If the user denies the counter offer, the user may continue to view the previously tuned-to program and/or television channel.

FIG. 4 is a diagram illustrating exemplary components of a device 400 that may correspond to one or more of the devices depicted in the previous Figures. As illustrated, according to an exemplary embodiment, device 400 may include a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, program device 160 and/or bandwidth broker 155 may be implemented as one or more program(s) and/or application(s). Additionally, for example, with reference to user device 170, one or more program(s) and/or application(s) may be used to display user interfaces, communicate with program device 160, etc. Additionally, for example, other devices may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

According to an exemplary embodiment, program device 160 receives programs from a network device (e.g., a media server, etc., not illustrated in FIG. 1) associated with network 105. Program device 160 may comprise tuners that permit program device 160 to tune to particular programs or television channels requested by users via user devices 170.

Figure 5A:
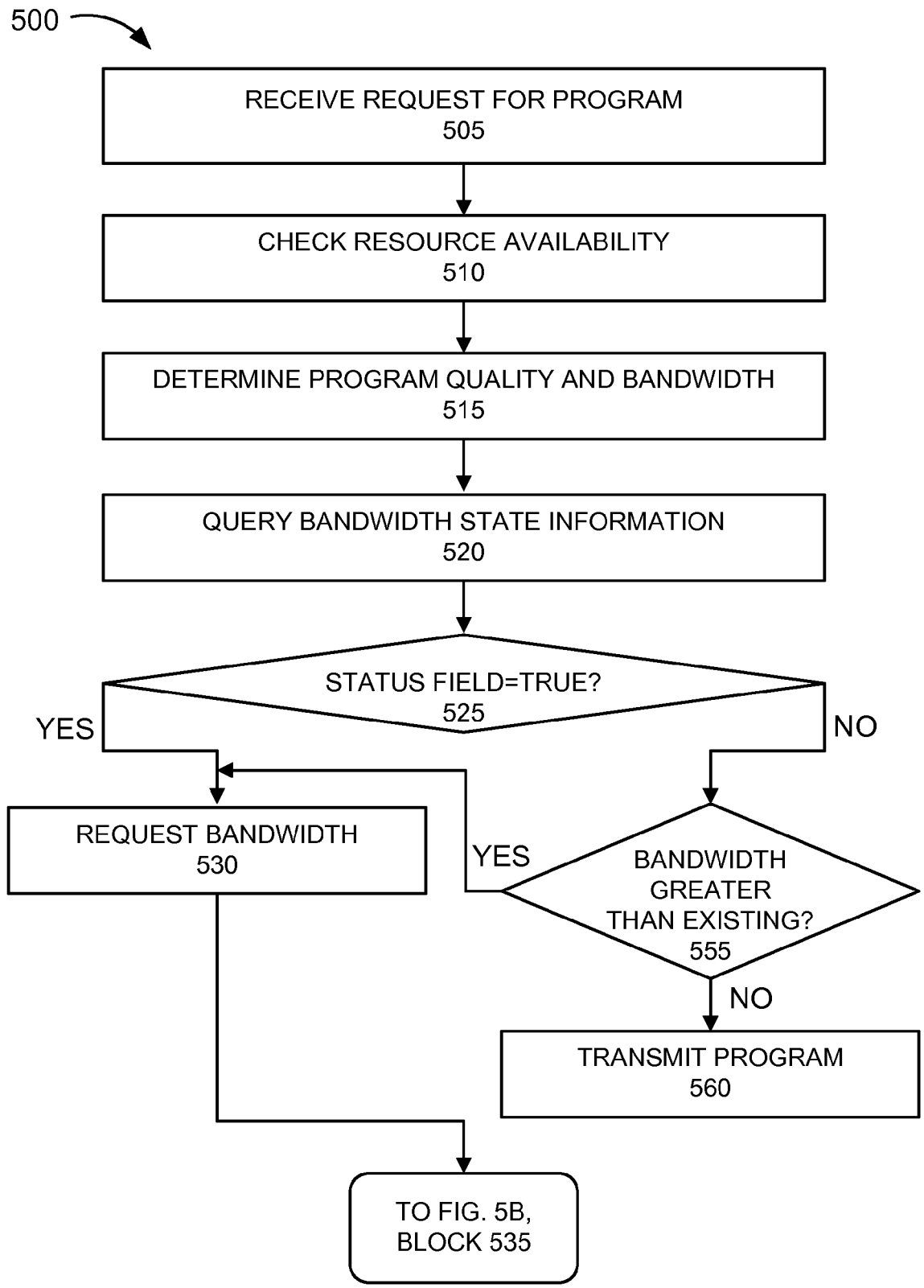
FIGS. 5A and 5B are flow diagrams illustrating an exemplary process pertaining to an exemplary embodiment of the program delivery system.
Figure 5B:
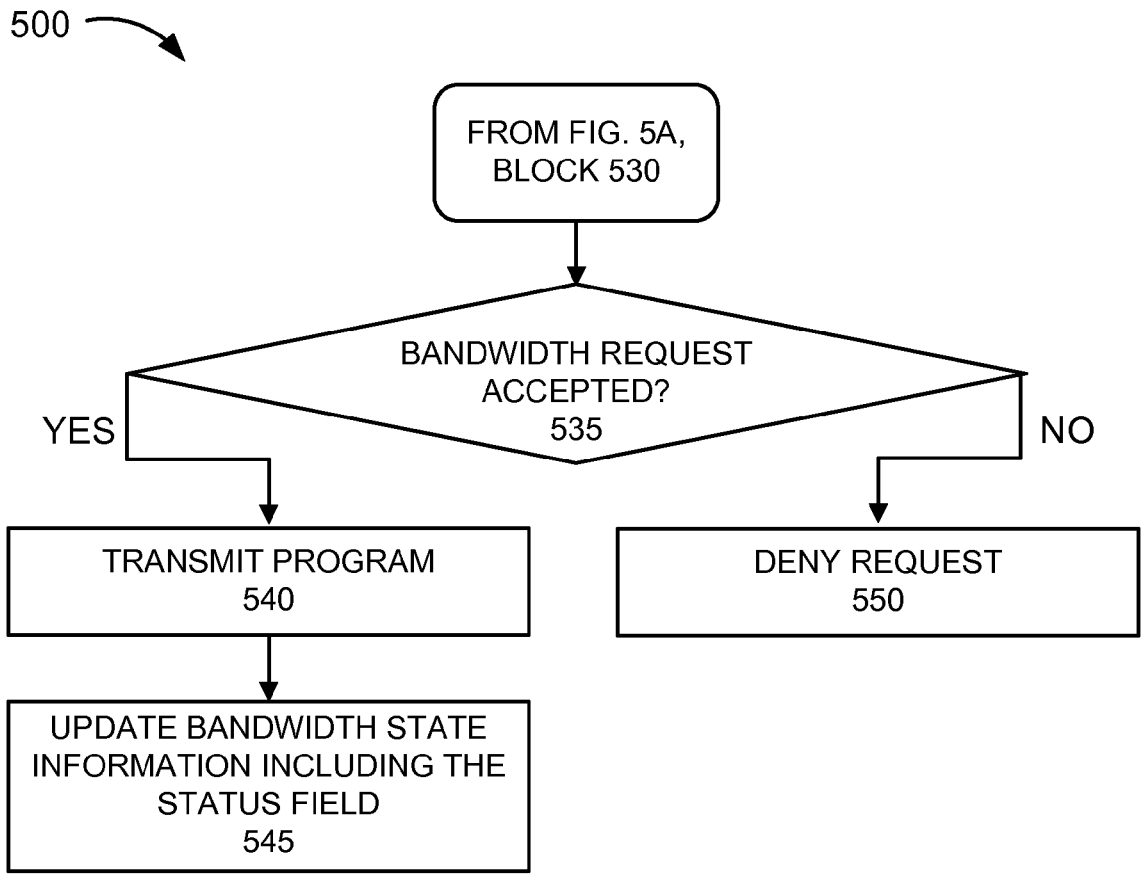

FIGS. 5A and 5B are flow diagrams illustrating an exemplary process 500 pertaining to an exemplary embodiment of a program delivery system. According to an exemplary embodiment, program device 160 performs one or more of the steps described in process 500. For example, processor 405 may execute software 415 to perform the steps described.

Referring to FIG. 5A, block 505, a request for a program is received. For example, user device 170 transmits a program request to program device 160, which is received by program device 160. The program request may include a television channel identifier or a program identifier.

In block 510, resource availability is checked. For example, program device 160 checks whether resources are available to service the program request. As an example, the resources may include transcoding resources (e.g., converting Quadrature Amplitude Modulation (QAM) signals to an MPEG signal (e.g., MPEG2, MPEG4, etc.), etc.), tuning resources (e.g., checking whether a tuner is available), and other program delivery resources provided by program device 160. According to this example, it is assumed that resources are available. In the event that resources are not available, program device 160 denies or suspends the servicing of the program request until resources are available.

In block 515, a program quality and a bandwidth is determined. For example, program device 160 determines the program quality and bandwidth for delivery of the program to user device 170 based on the program request. By way of example, a program quality (e.g., standard definition, high-definition, 3-D, etc.) may be mapped to a bandwidth or a range of bandwidth for provisioning the program to user device 170. Program device 160 selects an appropriate program quality and bandwidth pertaining to the program requested by user device 170. According to other implementations, the program quality may not be determined. For example, a user of user location 150 may have a television subscription that provides for only standard definition programs. According to such an example, the program quality may not be considered a factor and the amount of bandwidth needed to deliver programs to the user may be a relatively static value. Additionally, for example, a user may have different types of user devices 170 that allow for the receipt of multiple program qualities or a single program quality. Program device 170 may obtain user device information during an initial connection setup, and determine whether program quality is a factor based on the user device information. By way of example, the user device information may correlate with user device identifier information stored by user device identifier field 305. User device information may indicate the capabilities of user device 170 and/or subscription information pertaining to a program delivery service.

In block 520, bandwidth state information is queried. For example, program device 160 queries the bandwidth state information. According to an exemplary implementation, the bandwidth state information includes a user device identifier and a bandwidth. According to another implementation, the bandwidth state information includes a user device identifier, a status, and a bandwidth. According to this example, it may be assumed that bandwidth state information includes a status (e.g., status field 310). Program device 160 selects an entry (e.g., stored in a database or a data structure) pertaining to user device 170 based on user device identified field 305.

In block 525, it is determined whether a status field equals "true." For example, program device 160 identifies whether status field 310 indicates one of two binary states, such as "true" or "false."

If it is determined that the status field equals "true" (block 525-YES), then bandwidth is requested (block 530). For example, in response to identifying that status field 310 indicates "true," program device 160 generates and transmits a bandwidth request to bandwidth broker 155. The bandwidth request includes the determined bandwidth of block 515.

Referring to FIG. 5B, block 535, it is determined whether the bandwidth request is accepted (block 535). For example, program device 160 determines whether the bandwidth request is accepted by bandwidth broker 155 based on a bandwidth response received from bandwidth broker 155. For example, the bandwidth response indicates whether the requested bandwidth is provisioned.

If it is determined that the bandwidth request is accepted (block 535-YES), then the program is transmitted (block 540). For example, program device 160 provides the program to user device 170 using the allocated bandwidth. According to an exemplary implementation, when user device 170 is implemented as a set top box, program device 160 tunes to a particular television channel to provide the program requested by user device 170.

In block 545, the bandwidth state information including the status field is updated. For example, program device 160 updates status field 310 to indicate "false." Additionally, program device 160 updates bandwidth field 315 to indicate the provisioned bandwidth.

If it is determined that the bandwidth request is not accepted (block 535-YES), then the program request is denied (block 550). For example, program device 160 may deny the program request, suspend the program request, or generate and transmit a counter program response to user device 170, as previously described.

Referring back to FIG. 5A, if it is determined that the status field does not equal "true" (block 525-NO), then it is determined whether the bandwidth required to provision the program is greater than a current bandwidth allocation (block 555). For example, program device 160 compares the determined bandwidth of step 515 to the bandwidth indicated in bandwidth field 515.

If it is determined that the bandwidth required is greater than the current bandwidth allocation (block 555-YES), then process continues to block 530.

If it is determined that the bandwidth required is not greater than the current bandwidth allocation (block 555-NO), then the program is transmitted (block 560). For example, program device 160 provides the program to user device 170.

Although FIGS. 5A and 5B illustrate an exemplary process 500 pertaining to the interactive program system, process 500 may include additional operations, fewer operations, and/or different operations than those illustrated in FIGS. 5A and 5B and described herein.

As previously described, an embodiment of the program delivery system may be implemented using an IP-unicast and/or an IP multicast method. For example, according to a multicast platform in a program delivery system, user devices join and leave a multicast of a program (e.g., using Internet Group Management Protocol (IGMP) messages), which results in bandwidth allocation and de-allocation thrashing, particularly when the user changes programs numerous times (e.g., in a channel surfing situation). According to an exemplary embodiment, program device 160 may use bandwidth state information for bandwidth allocation and preservation.

The foregoing description of embodiments provides illustration, but is not intended to be exhaustive or to limit the embodiments to the precise form disclosed. Accordingly, modifications to the embodiments described herein may be possible. For example, program device 160 may identify when multiple user devices 170 have initiated a program request for the same program. For example, one user may initiate a program request, via user device 170, to watch program A, and is allocated bandwidth. Subsequently, another user may initiate a program request, via another user device 170, to watch program A.

In the event that a bandwidth response (e.g., from bandwidth broker 155) indicates that there is not sufficient bandwidth available (e.g., for the other user), program device 160 generates and transmits a counter program response to the other user device 170. The counter program response may cause the other user device 170 to generate a user message indicating that two or more user devices 170 are requesting to watch the same program, but that there is insufficient available bandwidth. The other user may be prompted if he or she would like to join the user(s). If the other user accepts the proposal, program device 160 transmits a request to user device 170. User device 170 generates a prompt indicating that another user wishes to join him or her. The user may then accept or deny the request. According to this scenario, assume the user accepts the request. Program device 160 transmits a response to the other user, which causes the other user device 170 to generate and display a message indicating the other user may join the user. According to another implementation, program device 160 may switch from a unicast method to a multicast method in response to identifying that two or more user device 170 are requesting to watch the same program. This process may be triggered based on such identification and/or only if there is insufficient available bandwidth.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings.

It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
    storing bandwidth state information pertaining to one or more user devices, wherein the bandwidth state information includes an amount of bandwidth allocated to each user device and communication path from each user device to a program device, and wherein the amount of bandwidth remains allocated to each user device after a requested program ends;
    receiving a request for a program from one of the one or more user devices;
    determining a bandwidth to deliver the program;
    querying the bandwidth state information;
    identifying whether the bandwidth state information indicates that the one of the one or more user devices is allocated bandwidth, based on a bandwidth allocated for a previous request for another program, that is at least equal to the determined bandwidth;
    requesting a bandwidth based on an identification that the bandwidth state information indicates that the one of the one or more user devices is not allocated bandwidth that is at least equal to the determined bandwidth;
    receiving an indication that the requested bandwidth is provisioned; and
    delivering the program to the one of the one or more user devices.

2. The method of claim 1, further comprising:
    omitting to request a bandwidth based on an identification that the bandwidth state information indicates that the one of the one or more user devices is allocated bandwidth that is at least equal to the determined bandwidth, wherein the program device resides in a home network.

3. The method of claim 1, further comprising:
    determining a program quality of the program based on a television channel identifier or a program identifier, and wherein the determining the bandwidth comprises:
    determining the bandwidth based on the determined program quality of the program.

4. The method of claim 1, wherein the bandwidth state information includes a status flag that indicates whether a previous request was received and bandwidth provisioned.

5. The method of claim 4, further comprising:
    requesting the bandwidth corresponding to the determined bandwidth based on an identification that the status flag indicates that a previous request was not received from the one of the one or more user devices.

6. The method of claim 4, wherein the bandwidth state information indicates that no bandwidth is allocated to the one of the one or more user devices if the bandwidth state information includes the status flag that indicates the previous request was not received from the one of the one or more user devices.

7. The method of claim 1, wherein the delivering is based on one of an Internet Protocol unicast of the program or an Internet Protocol multicast of the program.

8. The method of claim 1, further comprising:
    updating the bandwidth state information, pertaining to the one of the one or more user devices, to indicate the requested bandwidth as the amount of bandwidth allocated to the one of the one or more user devices.

9. A device comprising:
    a communication interface;
    one or more memories that store instructions; and
    one or more processors to execute the instructions to:
        store bandwidth state information pertaining to one or more user devices, wherein the bandwidth state information includes an amount of bandwidth allocated to each user device and communication path from each user device to a program device, and wherein the amount of bandwidth remains allocated to each user device after a requested program ends;
        receive, via a communication interface, a request for a program from one of the one or more user devices;
        query the bandwidth state information;
        identify whether the bandwidth state information indicates that the one of the one or more user devices is allocated bandwidth, based on a bandwidth allocated for a previous request for another program, that is at least equal to a required bandwidth to deliver the program;
        request, via the communication interface, a bandwidth based on an identification that the bandwidth state information indicates that the one of the one or more user devices is not allocated bandwidth that is at least equal to the required bandwidth;
        receive, via the communication interface, an indication that the requested bandwidth is provisioned; and
        deliver, via the communication interface, the program to the one of the one or more user devices.

10. The device of claim 9, wherein the one or more processors further execute the instructions to:
    omit to request a bandwidth based on an identification that the bandwidth state information indicates that the one of the one or more user devices is allocated bandwidth that is at least equal to the required bandwidth.

11. The device of claim 9, wherein the one or more processors further execute the instructions to:
    receive, via the communication interface, an indication that the requested bandwidth is not provisioned but that an alternate bandwidth is available to deliver the program;
    generate an offer indicating that the alternate bandwidth is available; and
    transmit, via the communication interface, the offer to the one of the one or more user devices.

12. The device of claim 9, wherein the one or more processors further execute the instructions to:
    determine a program quality of the program based on a television channel identifier or a program identifier; and
    select the required bandwidth based on the determined program quality of the program.

13. The device of claim 9, wherein the bandwidth state information includes a status flag that indicates whether a previous request was received and bandwidth provisioned.

14. The device of claim 9, wherein the one or more processors further execute the instructions to:
  request the bandwidth corresponding to the required bandwidth based on an identification that the status flag indicates that a previous request was not received from the one of the one or more user devices.

15. The device of claim 9, wherein the device includes an in-home media server device and the user device includes a set top box.

16. The device of claim 9, wherein the one or more processors further execute the instructions to:
  update the bandwidth state information, pertaining to the one of the one or more user devices, to indicate the requested bandwidth as the amount of bandwidth allocated to the one of the one or more user devices.

17. A non-transitory storage medium storing instructions executable by a computational device, wherein the instructions comprise instructions to:
  store bandwidth state information pertaining to one or more user devices, wherein the bandwidth state information includes an amount of bandwidth allocated to each user device and communication path from each user device to a program device, and wherein the amount of bandwidth remains allocated to each user device after a requested program ends;
  receive a request for a program from a user device;
  query the bandwidth state information;
  identify whether the bandwidth state information indicates that the user device is allocated bandwidth, based on a bandwidth allocated for a previous request for another program, that is at least equal to a required bandwidth to deliver the program;
  request a bandwidth based on an identification that the bandwidth state information indicates that the user device is not allocated bandwidth that is at least equal to the required bandwidth;
  receive an indication that the requested bandwidth is provisioned; and
  deliver the program to the user device.

18. The non-transitory storage medium of claim 17, wherein the instructions comprise instructions to:
  determine a program quality of the program based on a television channel identifier or a program identifier associated with the request; and
  determine the bandwidth based on the determined program quality of the program.

19. The non-transitory storage medium of claim 17, wherein the instructions comprise instructions to:
  update the bandwidth state information, pertaining to the user device, to indicate the requested bandwidth as the amount of bandwidth allocated to the user device.

20. The non-transitory storage medium of claim 17, wherein the instructions comprise instructions to:
  omit to request a bandwidth based on an identification that the bandwidth state information indicates that the user device is allocated bandwidth that is at least equal to the required bandwidth.

* * * * *